United States Patent

[11] 3,626,026

| [72] | Inventors | Masuo Fukumura<br>Tokyo-to;<br>Haruo Takahashi, Hiratsuka-shi; Shihoko Kawabe; Hajime Fukke, both of Tokyo-to, all of Japan |
|---|---|---|
| [21] | Appl. No. | 749,312 |
| [22] | Filed | Aug. 1, 1968 |
| [45] | Patented | Dec. 7, 1971 |
| [73] | Assignee | Kabushiki Kaisha Hitachi Seisakusho<br>Tokyo-to, Japan |
| [32] | Priorities | Nov. 17, 1965 |
| [33] | | Japan |
| [31] | | 40/70278;<br>Sept. 19, 1966, Japan, No. 41/61392; Oct. 24, 1966, Japan, No. 41/69706<br>Continuation-in-part of application Ser. No. 594,681, Nov. 16, 1966, now abandoned. This application Aug. 1, 1968, Ser. No. 749,312 |

[54] HOTMELT ADHESIVE COMPOSITIONS
1 Claim, No Drawings

[52] U.S. Cl. .................................................. 260/857,
260/27, 260/836, 260/873, 260/897, 260/899
[51] Int. Cl. ......................................................... C09j 3/26
[50] Field of Search ............................................ 260/27 E
VA, 897, 836, 28.5, 45.95, 899, 857, 873

[56] References Cited
UNITED STATES PATENTS

| 2,543,229 | 2/1951 | Chapman ..................... | 260/27 |
| 3,210,307 | 10/1965 | Paoloni ....................... | 260/28.5 |
| 3,236,914 | 2/1966 | Murdock et al. ............. | 260/857 |
| 3,253,059 | 5/1966 | Vollmer ....................... | 260/897 |
| 3,386,936 | 6/1968 | Gordy et al. ................. | 260/27 |

Primary Examiner—Hosea E. Taylor
Assistant Examiner—William Parker
Attorney—Waters, Roditi & Schwartz ABSTRACT: An adhesive composition composed of 50-95 parts by weight of at least one ethylene copolymer such as ethylene vinyl acetate copolymer, or ethylene-ethylacrylate copolymer, and 5-50 parts by weight of thermoplastic resin such as chlorinated polyethylenes, polyamides, polyesters, phenoxy resins, polyvinylbutyral, or ionomer resins.

The adhesive composition can further contain a conditioning agent, or it can be composed of 25-85 parts by weight of one or more ethylene copolymer such as ethylene vinyl acetate copolymer or ethylene-ethylacrylate copolymer, 5-50 parts by weight of thermoplastic resin such as chlorinated polyethylene, polyamides, polyesters, phenoxy resins, polyvinylbutyral, or ionomer resins, and 10-70 parts by weight of the conditioning agent such as low-molecular- weight polyethylenes, turpentine resins, or petroleum resins.

HOTMELT ADHESIVE COMPOSITIONS

This application is a continuation-in-part of the copending application Ser. No. 594681, filed Nov. 16, 1966, and now abandoned.

This invention relates to the so-called "hotmelt adhesive compositions," and, more particularly, to new and improved hotmelt adhesive compositions.

While a number of disclosures such as U.S. Pat. Nos. 2,657,187 and 2,657,189 relating to adhesive compositions of the hotmelt type, which have undergone rapid development in recent years in their applications under the nomenclature of "hotmelt adhesive compositions," have been made as early as 1953, most of these developments have been made during the last four or five years.

The examples of these adhesives compositions disclosed in patent specifications and in general publications may be broadly divided into the classes of:

1. polyethylene compositions in which, with polyethylenes as base materials, petroleum resins, butyl rubber, and polyisobutylenes are blended therewith;
2. polyamide compositions in which, with polyamides as base materials, epoxy resins, polymerized resins, and low molecular-weight polyethylenes are blended therewith; and
3. compositions respectively with polyvinylbutyrals, polyvinyl acetates, copolymers thereof, cellulose derivatives, polyesters, polyethylmethacrylic esters, and polyvinyl ethers as base materials, or
4. Compositions produced by mixing mixtures of paraffins or low-molecular-weight polyolefins and waxes with ehtylene-vinyl acetate copolymers.

While the adhesive compositions of these various classes exhibit an average strength in shear of 30 kg./cm$^2$ with respect to metals woods, ceramics, and ordinary synthetic resins, their adhesive strengths are merely approximately 5 to 20 kg./cm$^2$ with respect to polyolefins such as polyethylenes and polypropylenes, which have generally been considered to be difficult to bond with adhesives. For this reason, these adhesive compositions have been considered to be unsuitable as structural adhesives for materials such as moulded polyethylene articles and have been applied for use principally as adhesives for polyethylene laminated papers, aluminum foil laminates, and packaging materials such as carton boxes, and for shoe making.

Furthermore, these adhesive known heretofore have the great disadvantage of poor adhesive temperature characteristics for use as structural adhesives. Thus, at low temperatures or high temperatures, the adhesive strength of these compositions drop considerably. Moreover, they also have the fatal disadvantage for the purpose of being used as the structural adhesives because of being subject to creep rupture when loads are applied thereto for long periods of time.

It is an object of the present invention to provide hotmelt adhesive compositions having increased adhesive strength particular emphasis being placed on the improvement of adhesive strength at high and low temperatures, rubber elasticity, and creep resistance, and having, moreover, improved resistance with respect to not only shearing stress but also to peeling stress and cleavage stress and improved heat resistance and thermal stability.

A characteristic feature of the present invention for achieving the object of improving the polar adhesive force of the adhesive composition with respect to the material to be adhered with the adhesive and creep resistance of adhesive compositions and imparting rubber elasticity thereto consists in that at least one thermoplastic resins having relatively high softening point and polar functional group containing chlorine, nitrogen or oxygen is mixed to an ethylene copolymer, the thermoplastic resin being able to be uniformly mixed with or being compatible with said copolymer.

Examples of these thermoplastic resins are those having polar functional groups such as, for example, chlorinated polyethylenes, polyamides, polyesters, phenoxy resins, polyvinylbutyral, and ionomer resins.

An object of the present invention, in another aspect thereof, is to control the tackiness, softening point, viscosity, and other properties of the adhesive composition materials. Another feature of the invention in achieving this object is the addition of conditioning agents to the adhesive compositions.

Thus, the invention provides an adhesive composition which is capable of strongly bonding, without preparatory surface treatment of the surfaces to be bonded, not only various materials which can be bonded with known adhesive compositions, but also materials such as polyethylenes, polypropylenes, and polyesters which are difficult to bond without surface treatment with known adhesives, and which adhesive composition according to the invention is capable of exhibiting superior adhesive properties by comparison with those of known adhesives, particularly at high temperatures and low temperatures.

The adhesive composition of the invention is prepared, in general, by adding to and mixing with an ethylene copolymer such as an ethylenevinyl acetate copolymer or high polymers which are compatible therewith or mix uniformly therewith and have a relatively high softening point, and which have polar functional groups inclusive of a substance such as chlorine, nitrogen, or oxygen, the high polymer being so added and mixed singly or as a mixture with one or more other high polymers of similar kind. Examples of such high polymers are chlorinated polyethylenes, polyamides, polyesters, epoxy resins, phenoxy resins, and polyvinylbutyral.

The adhesive composition thus produced possesses highly advantageous features such as high polar adhesive force with respect to materials to be bonded and, at the same time, excellent adhesivity at high temperatures and low temperatures, and a remarkable improvement in creep resistance by comparison with that of known adhesive compositions.

Accordingly, this composition exhibits highly reliable adhesive performance, in actual practice, as structural adhesives. For example, for connecting structures such as polyethylene pipes, known adhesives of the hotmelt type cannot withstand the conditions of use because they are structurally weak with respect to shear and cleavage, whereas the use of the adhesive composition according to the invention makes such connections practically possible.

The term "ethylene copolymers" as referred to in the present disclosure is used in the same mean copolymers of ethylene with unsaturated polymeric organic esters such as vinyl acetate and ethyl acrylate. That is, these ethylene copolymers consist of ethylene-vinylacetate copolymer and ethylene-ethylacrylate copolymer.

In using the ethylene copolymers as above-described, it is necessary to consider their molecular weight, melt indexes, and comonomer contents. When the melt index is excessively low or high, it becomes difficult to improve the adhesive strength and creep resistance of the compositions. Therefore, ethylene copolymers used in the present invention are ethylene-vinylacetate copolymer having a melt index of 2.5 to 150 (that is, a molecular weight of 100,000–200,000) and a vinylacetate content of 18 to 40 percent by weight, and ethylene-ethylacrylate copolymer having a melt index of 2.5 to 28(that is, a molecular weight of 100,000–200,000) and ethyl-acrylate content of 20 to 30 percent by weight.

For the thermoplastic resins which are compatible with the above-stated ethylene copolymers or are mixable uniformly therewith, which are capable of improving the adhesive property at both high and low temperatures as well as creep resistant property, and which have relatively high softening points, chlorinated polyethylenes, polyamides, polyesters, phenoxy resins, polyvinylbutyrals, and ionomer resins are particularly suitable. The thermoplastic resins used in the present invention are as follows:

1. Chlorinated polyethylenes having a chlorine content of 10 to 40 percent by weight and a molecular weight of 20,000 to 30,000;
2. Polyamides having a molecular weight of 20,000 to 50,000, such as nylon resins and copolymerized nylon resins;

3. Polyesters having a molecular weight of 15,000 to 20,000;

4. Phenoxy resins having a molecular weight of approximately 30,000;

5. Polyvinylbutyrals having a polymerization degree of 500 to 1,500 and a degree of butyralization of 50 to 75; and 6. Ionomer resins having a melt index of 3 to 10.

The above-stated nylon resins include nylon 6 synthesized by the condensation of **-amino-caproic acid or open-ring polymerization of Σ-caprolactam, nylon 6.6 synthesized by the poly-condensation of hexamethylendiamine and adipic acid, nylon 6.10 synthesized by the poly-condensation of hexamethylenediamine and sebacic acid, and nylon 6.11 synthesized by the poly-condensation of hexamethylenediamine and 107-amino-undecanoic acid.

The above-stated copolymerized nylon resins are copolymers of nylon 6.6 salt, nylon 6.10 salt and Σ-caprolactam.

Polyesters are polyester resins containing terophthalic acid or isophthalic acid as dicarboxylic acids and containing ethylene glycol or neopentyl glycol as a dialcohols.

Phenoxy resins are thermoplastic resins having a molecular weight of approximately 30,000 which is synthesized from bisphenol-A and epichlorohydrin. It has the following structural formula:

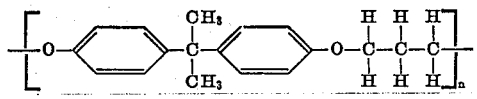

An example of this phenoxy resin is the phenoxy resin PAHJ which consists of the above-mentioned formula (unit) and the terminal groups of the composition are the following structural radical

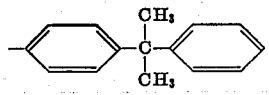

respectively, and since the molecular weight thereof is approximately 30,000, n equals approximately 100.

An ionomer resin is a copolymer with ethylene as its principal constituent, in which the long chains are mutually connected by ion coupling, and the anion to obtain the ion coupling among the molecules is a carboxylic group which derives from the principal chain produced due to copolymerization with ethylene, and the cation is a metal belonging to the first or second group of the Periodic Table such as Na, K, Mg, or Zn. An example of this ionomer resin is "SurlynA", manufactured by E.I. DuPont De Nemours and Company, U.S.A. while the other materials copolymerized with ethylene consist of unsaturated carboxylic acid such as acrylic acid, methacrylic acid and maleic acid, and while the molecular weights thereof are not published, the melt indexes to show the properties thereof are known.

In using the thermoplastic resins as above-described, it is necessary to consider their molecular weights, that is, their melt indexes. When the melt index is excessively low, the melting and mixing characteristics and the handling property of the adhesive composition become poor. On the other hand, when the melt index is excessively high, it becomes difficult to improve the adhesive strength and creep resistance of the composition.

A conditioning agent is an addition agent to lower or control the viscosity of ethylene copolymers, which consists of one or more substances such as low-molecular-weight polyethylenes, turpentine resins or petroleum resins. Suitable conditioning agents used in the present invention are as follows:

1. Low-molecular-weight polyethylenes having a molecular weight of 1,500 to 7,000;

2. Turpentine resins having a molecular weight of 800 to 1,200; and

3. Petroleum resins having a molecular weight of 800 to 1,500.

When a hotmelt adhesive composition is to be used, it is heated and melted to a liquid state. The composition, which is thus caused do have good wettability with respect to the materials to be bonded and to possess high adhesive properties, is then applied as a coating on the surfaces to be bonded, which are thereafter placed in contact with each other and then left standing to enable the adhesive composition to cold-harden, whereby a strong adhesive bond is obtained.

While a hotmelt adhesive has various other advantages and disadvantages as compared with other adhesives, such as those of the solvent type of those setting at room temperature of thermosetting adhesives involving chemical reaction, such a hotmelt adhesive is highly advantageous in that it can be rendered into an adhesive bond merely by leaving the adhesive composition to cool, whereby the bonding work is completed in a number of seconds. Accordingly, such a hotmelt adhesive composition can be used in continuous bonding processes, whereby there is a trend in recent years toward an increase in the demand for hotmelt adhesive compositions.

While materials such as sealing wax, asphalt, and paraffine, known for many years, may be classified as hotmelt adhesive compositions, they provide unsatisfactory adhesion. It may be said that only with the appearance of polymers of the above-mentioned kind in recent years have hotmelt adhesive begun to receive sudden attention and interest.

The properties of the hotmelt adhesive compositions have been steadily and considerably improved. However, the present invention affords an even further advance in that it provides a hotmelt adhesive composition which, in comparison with known adhesive compositions, exhibit remarkably superior adhesion properties, not only with respect to ordinary materials to be bonded, but also with respect to polyolefins such as polyethylenes and polypropylenes which heretofore have been considered to be difficult to bond with adhesives. Thus, the hotmelt adhesive composition of the invention is capable of bonding various materials, other than that known by the Trade Mark "Teflon," without the necessity of special pretreatment of the surfaces to be bonded, and can be effectively used as an adhesive composition for structural use.

In general, an ethylene copolymer causes a lowering of the degree of crystallization of polyolefins such as polyethylene and polypropylene and, at the same time, improves adhesive performance with respect to ordinary materials to be bonded by the addition of polar groups. Furthermore, an ethylene copolymer maintains compatibility with respect to polyolefins and, at the same time, is compatible also with turpentine resins which have compatibility with polyolefins. Accordingly, the blending of turpentine resins with ethylene copolymers serves to lower or control the viscosity of these ethylene copolymers when they are melted. Ethylene copolymers modified with turpentine resins, therefore, are capable of preserving ample adhesive strength for general uses such as packaging and box-making but are not entirely satisfactory, as to adhesive strength, for bonding polyolefins such as polyethylene and polypropylene in structural use.

The adhesive composition according to the present invention includes mixtures produced by blending with ethylene copolymers thermoplastics resins which are compatible or uniformly mixable therewith and have a relatively high melting temperature, and which, moreover, have polar groups of high intermolecular force, this thermoplastic resin being so blended either singly or in combination with one or more other thermoplastic resins of like character, examples of such thermoplastic resins being chlorinated polyolefins, polyamides, polyesters, phenoxy resins, polyvinylbutyral, and ionomer resins.

By thus blending one or more of these thermoplastic resins, the resulting adhesive composition is caused to have increased adhesive strength not only with respect to shear stress but also with respect to peeling stress and cleavage stress.

Furthermore, this adhesive composition is thereby remarkably improved with regard to the drop in adhesive strength at high temperatures and low temperatures which is a drawback of known hotmelt adhesive compositions. Moreover, since the adhesive composition according to the invention has excellent creep resistance, the adhesive bonds made thereby are not subject to failure even when subjected to continuously applied loads for long periods of time.

Thus, the adhesive composition according to the invention exhibits excellent performance as a structural adhesive with respect generally to ordinary materials, exclusive of that known by the Trade Mark "Teflon," to be bonded and exhibits remarkable adhesive strength particularly in the bonding of polyolefins without necessitating pretreatment of the surfaces. A further feature of the present adhesive is that it has high heat-resistance and can withstand continuous heating for long periods without deterioration of performance.

The present adhesive composition can be caused to exhibit its excellent adhesive properties in an even more effective manner by the further addition of one or more of various substances (herein referred to collectively as "conditioning agents"), and heat deterioration preventive agents. Examples of suitable conditioning agent are turpentine resins, petroleum resins, and low-molecular-weight polyethylenes for imparting plasticity and tackiness, for controlling the softening point and viscosity, and for controlling the temperature characteristics of adhesive strength.

When no additive is employed, the desirable blending proportion for the adhesive composition according to the present invention are as follows:

a. From 50 to 95 parts by weight of one or more ethylene copolymers such as ethylene-vinylacetate copolymer having a melt index of from 2.5 to 150 and a vinylacetate content of from 18 to 40 percent by weight, or an ethylene-ethylacrylate copolymer having a melt index of from 2.5 to 28 and ethyl acrylate content of from 20 to 30 percent by weight; and b. From 5 to 50 parts by weight of one or more thermoplastic resins such as chlorinated polyethylenes having a chlorine content of from 10 to 40 percent by weight and a molecular weight of from 20,000 to 30,000, polyamides such as nylon resins or copolymerized nylon resins having a molecular weight of from 20,000 to 50,000, polyesters having a molecular weight of from 15,000 to 20,000, phenoxy resins having a molecular weight of approximately 30,000, polyvinylbutyral having a polymerization degree of from 500 to 1,500 and a butyralization degree of from 50 to 75, and ionomer resins having a melt index of from 3 to 10.

In case additives such as conditioning agents are to be added to the above-described mixtures, the desirable blending proportions may be as follows:

a. From 25 to 85 parts by weight of one or more ethylene copolymers such as ethylene-vinylacetate copolymer having a melt index of from 2.5 to 150 and a vinylacetate content of from 18 to 40 percent by weight, and ethylene-ethylacrylate copolymer having a melt index of from 2.5 to 28 and an ethylacrylate content of from 20 to 30 percent by weight;

b. From 5 to 50 parts by weight of one or more thermoplastic resins such as chlorinated polyethylenes having a chlorine content of from 10 to 40 percent by weight and a molecular weight of from 20,000 to 30,000, polyamides such as nylon resins and copolymerized nylon resins having a molecular weight of from 20,000 to 50,000, polyesters having a molecular weight of from 15,000 to 20,000, phenoxy resins having a molecular weight of approximately 30,000, polyvinylbutyral having a polymerization degree of from 500 to 1,500 and a butyralization degree of from 50 to 75, and ionomer resins having a melt index of from 3 to 10; and c. From 10 to 70 parts by weight of one or more conditioning agent such as low-molecular-weight polyethylenes having a molecular weight of from 1,500 to 7,000, turpentine resins having a molecular weight of from 800 to 1,200, and petroleum resins having a molecular weight of from 800 to 1,500.

In order to indicate more fully the nature and utility of the present invention, the following examples of typical adhesive compositions according to the invention and their characteristics are set forth, it being understood that these examples are presented as illustrative only and that they are not intended to limit the scope of the invention as defined by the appended claims.

EXAMPLES 1 TO 5 INCLUSIVE

An ethylene-vinyl acetate copolymer having a vinyl acetate content of 18 percent by weight and a melt index of 150 and (except in example 1) a chlorinated polyethylene with a chlorine content of approximately 30 percent prepared by chlorinating a high-density polyethylene of an average molecular weight of approximately 30,000, were blended in the various blending proportions be weight indicated in the following table 1.

Each of the mixtures thus blended was heated for approximately 20 minutes in a thermostatic chamber at approximately 160° C., and, when all of the mixture had melted, it was further heated at 180° C. with thorough agitation. Then, after it ascertaining that the chlorinated polyethylene had mutually dissolved with the ethylene copolymer, the resulting material was heated up to and at a maximum temperature of 200° C. The resulting material, upon becoming a uniform molten material, was left to cool naturally, whereby an example of the adhesive composition according to the invention was obtained (except in the case of example 1).

TABLE 1

| Example Number | 1 | 2 | 3 | 4 | 5 |
| --- | --- | --- | --- | --- | --- |
| Ethylene copolymer, (parts by weight) | 100 | 90 | 80 | 60 | 40 |
| Chlorinated polyethylene, (parts by weight) | 0 | 10 | 20 | 40 | 60 |
| Adhesive strength with respect to shear, $\sigma s$, of resulting adhesive composition (kg./cm.$^2$, room temp.) | 28.0 | 38.0 | 42.2 | 40.0 | 34.6 |

In table 1, the symbol $\sigma s$ denotes the adhesive shear strength of the adhesive composition produced in each example, the values thereof being obtained from tests carried out at room temperature on test pieces, all of a polyethylene, bonded by the respective adhesive compositions.

The table 1, it is apparent that the addition of a chlorinated polyethylene remarkably increases the adhesive strength of the adhesive composition.

One example of the manner in which the adhesive composition, produced as in any of the above-described examples, may be used is as follows. For convenience in using the adhesive composition, it is first cut into bars of suitable size. Then, in bonding together pieces of a polyethylene, for example, the surfaces of the pieces to be bonded are heated for approximately 1 to 2 seconds with a gas flame at a temperature of approximately 900° C. Simultaneously, the adhesive composition in bar form is melted by the gas flame and applied on to the polyethylene surfaces to be bonded, which are then placed in mutual contact while the adhesive composition applied thereon is still molten. Full adhesive strength is attained when the adhesive composition hardens, whereby an adhesive strength is obtained as indicated in table 1.

EXAMPLE 6

An example wherein a turpentine resin as a conditioning agent was added to the basic components of examples 1 to 5 will now be considered. In this example, the following ingredients were used.

Ethylene-vinyl acetate copolymer: 200 grams

Chlorinated polyethylene: 100 grams
Turpentine resin having a molecular weight of approximately 1000: 350 grams
Heat deterioration preventing agent: 0.5 gram Similarly as in examples 1 to 5, the ethylene-vinyl acetate copolymer and the chlorinated polyethylene were mixed and heated to form a molten mixture. Next, the turpentine resin and the heat deterioration preventive agent (for example, 4,4'-thio-bis (6-tertiary butyl-3-methylphenol)) were mixed, and the resulting mixture was added to the molten mixture. The resulting mixture was heated to and at a maximum temperature of from 190° to 200° C. while being thoroughly agitated. After a uniform molten material was thus obtained, it was left to cool naturally and harden.

When tested at room temperature as described above with respect to examples 1 to 5, the resulting adhesive composition exhibited an adhesive shear strength, $\sigma s$, of 41.5 kg./cm$^2$.

EXAMPLE 7

The following materials were used in a manner as described hereinbelow:
Ethylene-vinyl acetate copolymer: 200 grams
Chlorinated polyethylene: 100 grams
Low-molecular-weight polyethylene: 200 grams
Heat deterioration preventive agent: 0.5 gram As one example of a low-molecular-weight polyethylene, one having a molecular weight of approximately 2,500 was used. The ethylene-vinyl acetate copolymer, the chlorinated polyethylene, and the low-molecular-weight polyethylene were mixed and melted together to form a uniform molten mixture similarly as described with reference to examples 1 to 5. The heat deterioration preventive agent was added to and mixed with this molten mixture, and the resulting mixture was heated with thorough agitation to and at a maximum temperature of 190° C. and rendered into a uniform molten material, which was then left to cool.

When the adhesive composition thus produced was used to bond together pieces of a polyethylene and tested at room temperature, it exhibited an adhesive shear strength, $\sigma s$, of 40.8 kg./cm$^2$.

EXAMPLE 8

The following recipe was used in a manner as described hereinbelow:
Ethylene-vinyl acetate copolymer: 200 grams
Chlorinated polyethylene: 200 grams
Turpentine resin: 500 grams
Low-molecular-weight polyethylene: 100 grams
Heat deterioration preventive agent: 0.7 gram The ethylene-vinyl acetate copolymer, chlorinated polyethylene, and low-molecular-weight polyethylene were blended to form a mixture, which was then heated in a thermostatic chamber at approximately 150° C. for approximately 15 minutes until the entire mixture had melted, and the molten batch was then heated further at 170° C. with thorough agitation. Then, after it was ascertained that the chlorinated polyethylene had mutually dissolved with the other constituents, a mixture of the turpentine and the heat deterioration preventive agent was added to the molten batch, and the resulting batch was heated with thorough agitation to a maximum temperature of from 190° to 200° C. until a uniform molten material was obtained. This material was left to cool and harden, whereupon an adhesive composition having an adhesive strength as indicated in table 2 (following example 10) was obtained.

EXAMPLE 9

The following recipe was used in a manner as described hereinbelow:
Ethylene-vinyl acetate copolymer: 100 grams
Ethylene-ethyl-acrylate copolymer: 100 grams
Chlorinated polyethylene: 100 grams
Turpentine resin: 400 grams
Low-molecular-weight polyethylene: 200 grams
Heat deterioration preventive agent: 0.7 gram The above specified ethylene-ethyl acrylate copolymer is a copolymer having an ethyl acrylate content of approximately 20 percent and melt index 18.

The above materials were used as set forth in example 8. The adhesive strength of the resulting adhesive composition was as indicated in table 2.

EXAMPLE 10

The following recipe was used to produce an example of the adhesive composition according to the invention:
Ethylene-vinyl acetate copolymer: 150 grams
Ethylene-ethylacrylate copolymer: 50 grams
Chlorinated polyethylene: 100 grams
Petroleum resin: 400 grams
Low-molecular-weight polyethylene: 200 grams
Heat deterioration preventive agent: 0.5 gram The above specified petroleum resin is a thermoplastics material produced by the polymerization of an unsaturated hydrocarbon obtained by the high-temperature cracking of petroleum. One example of this thermoplastic is that known by the Trade Mark "Piccopale 100" (manufactured by Esso Petroleum Company), having a melting point of 100° and a molecular weight of 1,400.

As indicated in table 2, the adhesive characteristics of the resulting adhesive composition were superior at higher temperatures to those of the adhesive compositions produced according to examples 8 and 9.

The adhesive characteristics of the hotmelt adhesive compositions produced according to examples 8 to 10, inclusive, are indicated in table 2, together with those of a known hot-melt adhesive composition for comparison purposes.

TABLE 2

| | Adhesive strengths (kg./cm.$^2$) | Test temperature | | | | |
|---|---|---|---|---|---|---|
| | | 25° C. | 40° C. | 50° C. | 60° C. | 70° C. |
| Example No.: | | | | | | |
| 8 | $\sigma s$ | 42.1 | 30.0 | 22.2 | 17.3 | 10.0 |
|   | $\sigma c$ | 30.7 | 28.5 | 24.0 | 16.1 | 13.1 |
| 9 | $\sigma s$ | 40.2 | 32.0 | 24.8 | 16.4 | 12.1 |
|   | $\sigma c$ | 27.3 | 25.6 | 22.4 | 15.5 | 12.0 |
| 10 | $\sigma s$ | 36.4 | 32.2 | 28.3 | 20.0 | 11.1 |
|    | $\sigma c$ | 26.8 | 25.4 | 21.7 | 15.8 | 12.4 |
| Known product | $\sigma s$ | 20.5 | 16.3 | 9.2 | 5.5 | 0 |
|               | $\sigma c$ | 7.5 | 5.4 | 2.9 | 1.5 | 0 |

In table 2, $\sigma s$ denotes adhesive shear strength, and $\sigma c$ denotes adhesive cleavage strength (both in kg./cm$^2$.). The strength values were obtained from respective tests on test pieces prepared by adhesively bonding pieces of hard polyethylene of 2 mm. thickness and are respectively average values of measured values on five test pieces. The tests were carried out in conformance with the specifications of the Japanese Industrial Standards (J.I.S.).

As indicated in table 2, the examples of the present invention exhibit much higher adhesive strengths than the known product, not only at room temperature (25° C.) but also at higher temperatures, at which the rate of lowering of adhesive strengths is less in the case of the examples of the invention. It is to be observed, particularly, that the adhesive cleavage strengths of the examples of the invention are far superior to those of the known product.

The effect of adding chlorinated polyethylene in adhesive compositions of the class represented by the products of the above examples 8 to 10 as indicated by the following table.

TABLE 2'

| Proportion of chlorinated polyethylene added. (percent) | 0 | 5 | 10 | 20 | 30 | 40 |
|---|---|---|---|---|---|---|
| Adhesive shear strength (kg./cm.$^2$) | 25.8 | 32.8 | 42.1 | 41.8 | 35.2 | 30.5 |

The proportions of chlorinated polyethylene added in the above table represent values which, together with the corresponding proportions of the ethylene copolymers, total 100 parts by weight.

The reason for the increase in adhesive strength due to addition of a chlorinated polyethylene may be considered as follows. During the heating, melting, and mixing of the various ingredients, quite probably, a portion of the chlorinated polyethylene dissociates, and gives off chlorine, at the same time producing free radicals and undergoing cross-linking with the coexisting ethylene copolymer or ethylene additive, whereby a three-dimensional structure is developed. As a result, rubber elasticity is produced, and the adhesive strength is increased.

EXAMPLES 11 TO 18

An ethylene-vinyl acetate copolymer having a vinyl acetate content of 18 percent by weight and a melt index of 150, and a copolymerized nylon consisting of a copolymer of nylon 6.6 salt, nylon 6.10 salt and $\Sigma$-caprolactam, and having a tensile strength of 520 kg./cm.$^2$. At 23° C. and a molecular weight of 40,000–500,000, as one example of a polyamide, were blended in the various blending proportions by weight indicated in table 3.

Each of the mixtures thus formed was heated for approximately 20 minutes in a thermostat at 190° C., whereupon the entire mixture melted, and the molten material was heated further at 220° C. with agitation until it assumed a uniform state. The molten material was then left to cool, whereby, in the case of examples 14 to 18, an example of adhesive composition according to the invention was obtained.

In table 3, the quantities of the constituents are given in parts by weight, and the values of the adhesive shear strengths of the respective adhesive compositions (in kg./cm.$^2$ were obtained from tests carried out at room temperature on test pieces of a polyethylene bonded together with the adhesive compositions.

TABLE 3

| Example Number | 11 | 12 | 13 | 14 | 15 | 16 | 17 | 18 |
|---|---|---|---|---|---|---|---|---|
| Ethylene-vinyl acetate copolymer | 100 | 90 | 80 | 70 | 60 | 50 | 40 | 30 |
| Copolymerized nylon | 0 | 10 | 20 | 30 | 40 | 50 | 60 | 70 |
| Adhesive shear strength at room temp. (kg./cm.$^2$) | 47 | 51 | 52 | 50 | 48 | 47 | 31 | 26 |

It is apparent from table 3 that excellent results are produced by the use of 50 or more parts by weight of the ethylene-vinyl acetate copolymer.

The product of example 11 (without copolymerized nylon) exhibited an excellent adhesive shear strength at room temperature but, with rising temperature, a rapid drop in adhesive strength resulted, and the application of a static stress of 10 kg./cm.$^2$ at 40° C. resulted in creep failure of the adhesive bond. In contrast, adhesive compositions prepared by admixture of a polyamide did not exhibit creep failure over long periods of test under the same conditions.

From these results, the effectiveness of mixing and melting polyamide resins with the ethylene-vinyl acetate copolymer is clearly apparent.

EXAMPLES 19 TO 23

An ethylene-vinyl acetate copolymer having a vinyl acetate content of 18 percent by weight and a melt index of 150 and a polyvinylbutyral resin of a polymerization degree of 1,500 and a degree of butyralization of 55 were blended in the various blending proportions by weight indicated in table 4.

The mixtures thus formed were then subjected to the same process steps of melting, mixing, and cooling as set forth for examples 11 to 18, whereupon, in the case of examples 19 to 21, respective adhesive compositions according to the invention were obtained. The results of adhesive shear strength tests carried out at room temperature on test pieces bonded with those compositions are indicated in table 4.

TABLE 4

| Example Number | 11[1] | 19 | 20 | 21 | 22 | 23 |
|---|---|---|---|---|---|---|
| Ethylene-vinyl acetate copolymer | 100 | 80 | 60 | 50 | 40 | 20 |
| Polyvinylbutyral | 0 | 20 | 40 | 50 | 60 | 80 |
| Adhesive shear strength at room temp. (kg./cm.$^2$) | 47 | 50 | 48 | 42 | 30 | 18 |

[1] Reference.

In the above described examples, also, the use of 50 or more parts by weight of the ethylene-vinyl acetate copolymer produces excellent results. Furthermore, the application over long periods of a static stress of 10 kg./cm.$^2$ at 40° C. on test pieces respectively bonded with the adhesive compositions produced according to examples 19 to 21 did not result in any creep failure.

Next, examples of the case where conditioning agents are added to the above described mixtures are presented. It was found that the addition of these conditioning agents improves the handling properties of the adhesive compositions.

EXAMPLES 24 TO 29

An ethylene-vinyl acetate copolymer having a vinyl acetate content of 18 percent by weight and a melt index of 150, a nylon 6.10 resin having a tensile strength of 600 kg./cm.$^2$ and a tensile modulus of elasticity of 23,400 kg./cm.$^2$ at 23° C. as one example of a polyamide, and a low-molecular-weight polyethylene of an average molecular weight of approximately 2,500, as one example of a conditioning agent, or phenoxy resin PAHJ (trademark for a product of Union Carbide Corporation) having a polymerization degree of approximately 100 (a molecular weight of approximately 30,000), as one example of a phenoxy resin, were blended in the various blending proportions by weight indicated in table 5.

Each of the mixtures thus formed was heated in a thermostat at 180° C. for approximately 20 minutes until the entire mixture melted, whereupon the molten mixture was further heated from 200° C. to 220° C. with thorough agitation and rendered into a uniform molten mixture, which was then left to cool. In this manner examples of adhesive compositions according to the invention were produced. The results of adhesive shear strength tests on test pieces bonded with these adhesive compositions are indicated in table 5.

TABLE 5

| Example Number | 24 | 25 | 26 | 27 | 28 | 29 |
|---|---|---|---|---|---|---|
| Ethylene-vinyl acetate copolymer | 80 | 70 | 60 | 80 | 70 | 60 |
| Polyamide | 10 | 20 | 30 | 10 | 20 | 20 |
| Low-molecular weight polyethylene | | | | 10 | 10 | 20 |
| Phenoxy resin | 10 | 10 | 10 | | | |
| Adhesive shear strength at room temp. (kg./cm.$^2$) | 46 | 47 | 42 | 50 | 48 | 50 |

EXAMPLES 30 TO 33

An ethylene-vinyl acetate copolymer having a vinyl acetate content of 18 percent by weight and a melt index of 150, a polyvinylbutyral resin of a polymerization degree of 1,500 and a degree of butyralization of 55, and a low-molecular-weight polyethylene of a molecular weight of 2,500 were blended in the various blending proportions by weight indicated in table 6.

The resulting mixtures were subjected to the same process steps of melting, mixing, and cooling as set forth for examples 24 to 29 thereby to produce examples of adhesive compositions according to the invention. The results of adhesive shear strength tests carried out on these adhesive compositions are indicated in table 6.

TABLE 6

| Example Number | 30 | 31 | 32 | 33 |
|---|---|---|---|---|
| Ethylene-vinyl acetate copolymer | 80 | 70 | 70 | 60 |
| Polyvinylbutyral | 10 | 10 | 20 | 20 |
| Low-molecular-weight polyethylene | 10 | 20 | 10 | 20 |
| Adhesive shear strength at room temp. (kg./cm.²) | 49 | 49 | 49 | 49 |

EXAMPLES 34 TO 37

An ethylene-vinyl acetate copolymer having a vinyl acetate content of 18 percent by weight and a melt index of 150, Surlyn A (Trade Mark, product of E. I. DuPont De Nemours and Company, U.S.A.) having a melt index of 10 as one example of an ionomer resin, and a low-molecular-weight polyethylene having a molecular weight of approximately 1,500 were blended in the weight proportions indicated in table 7.

The resulting mixtures were then subjected to the same process steps of melting, mixing, and cooling as set forth for examples 24 to 29 to produce examples of adhesive compositions according to the invention. The results of adhesive shear strength tests carried on these adhesive compositions are indicated in table 7.

TABLE 7

| Example Number | 34 | 35 | 36 | 37 |
|---|---|---|---|---|
| Ethylene-vinyl acetate copolymer | 80 | 70 | 60 | 50 |
| Surlyn A | 10 | 20 | 30 | 40 |
| Low-molecular-weight polyethylene | 10 | 10 | 10 | 10 |
| Adhesive shear strength at room temp. (kg./cm.²) | 48 | 48 | 48 | 47 |

EXAMPLES 38 TO 46

To an ethylene-ethyl acrylate copolymer having an ethyl acrylate content of approximately 20 percent and melt index of 18 and a polyester resin, a low-molecular-weight polyethylene having a molecular weight of approximately 2,500, a nylon 6.10 resin having a molecular weight of approximately 30,000 as one example of a polyamide, phenoxy resin PAHJ (trademark for a product of Union Carbide Corporation) having a polymerization degree of approximately 100 (a molecular weight of approximately 30,000) as one example of a phenoxy resin were added in the various weight proportions indicated in table 8.

The resulting mixtures were processed similarly as in examples 24 to 29 to produce examples of adhesive compositions according to the invention.

The above specified polyester resin is a thermoplastic resin consisting of a telephthalic acid with an ethylene glycol, and having a molecular weight of 15,000 to 20,000 and a tensile strength of 500 kg./cm.² at room temperature and a molten viscosity at 200° C. of 4,000 poise.

TABLE 8

| Example number | 38 | 39 | 40 | 41 | 42 | 43 | 44 | 45 | 46 |
|---|---|---|---|---|---|---|---|---|---|
| Ethylene-ethylacrylate copolymer | 80 | 70 | 60 | 80 | 70 | 60 | 80 | 70 | 60 |
| Polyester | 10 | 20 | 30 | 10 | 20 | 30 | 10 | 20 | 30 |
| Phenoxy resin | 10 | 10 | 10 | | | | | | |
| Polyamide | | | | 10 | 10 | 10 | | | |
| Low-molecular-weight polyethylene | | | | | | | 10 | 10 | 10 |
| Adhesive shear strength at room temp. (kg./cm.²) | 47 | 47 | 47 | 48 | 48 | 47 | 48 | 48 | 48 |

The variations of adhesive shear strength with variation in temperature of the hotmelt adhesive compositions of examples 39, 42, and 45 as well as those of examples 25 and 28 were measured. The results are shown in table 9 together with that of a known product.

TABLE 9

| | Test temperature | | | | |
|---|---|---|---|---|---|
| | −10° C. | 0° C. | 20° C. | 50° C. | 70° C. |
| | σs (kg./cm.²) | σs (kg./cm.²) | σs (kg./cm.²) | σs (kg./cm.²) | σs (kg./cm.²) |
| Example No.: | | | | | |
| 25 | >70 | >60 | 50 | 34 | 24 |
| 28 | >70 | >60 | 50 | 36 | 26 |
| 39 | >70 | >60 | 52 | 36 | 26 |
| 42 | >70 | >60 | 52 | 35 | 27 |
| 45 | >70 | >60 | 53 | 38 | 29 |
| Known product | 35 | 40 | 20 | 9 | 0 |

A further feature of the adhesive compositions according to the invention which contain the above stated group of constituents is that these compositions have excellent resistance to heat deterioration and to creep. Samples of these adhesive compositions, after being left for over 24 hours in a thermostatic chamber at 200° C., exhibited no change in outer appearance and viscosity and no deterioration whatsoever of adhesive characteristics.

The excellent creep resistance characteristic of these adhesive compositions was demonstrated by the result of one excessive test in which metal pieces were bonded with these compositions and subjected continuously to a static stress of 10 kg./cm.² at a temperature of 40° C., and no creep failure occurred in the bonds even after the elapse of 2,500 hours. In contrast, known products on the market were found to fail easily because of creep when tested under the same conditions, so that these known products may be considered to be unusable for many applications.

Examples of materials which can be effectively bonded by the adhesive composition of the present invention are: metals such as iron, aluminum, copper, and alloys thereof as well as metals in general; all synthetic resins except for Teflon (Trade Mark) such as polyvinyl chloride, acrylic resins, polystyrene, ABS resins, polycarbonates, melamine resins, phenol resins, polyethylene, polypropylene, and polyesters; and ceramics such as porcelain and glass.

The adhesive composition according to this invention can be also used effectively for forming surface coating material and for other uses, in addition to their prime intended use as an adhesive.

We claim:
1. An adhesive composition consisting of:
   a. from 50 to 95 parts by weight of at least one ethylene copolymer selected from the group consisting of an ethylene vinyl acetate copolymer having a melt index of from 2.5 to 150 and a vinyl acetate content of from 18 to 40 percent by weight, and an ethylene-ethyl acrylate copolymer having a melt index of from 2.5 to 28 and an ethyl acrylate content of from 20 to 30 percent by weight; and
   b. from 5 to 50 parts by weight of at least one thermoplastic resin selected from the group consisting of polyamides selected from the group consisting of (1) the condensation product of ω-amino caproic acid or the product of the open ring polymerization of Σ-caprolactam, (2) the poly-condensation product of hexamethylene diamine and adipic acid, (3) the poly-condensation product of hexamethylene diamine and sebacic acid, (4) the poly-condensation product of hexamethylene diamine and ω-amino-undecanoic acid and copolymers consisting of the salt of polyamide (2), the salt of polyamide (3) and Σ-caprolactam and having a molecular weight of from 20,000 to 50,000, polyesters consisting of the composition formed by reaction of a dicarboxylic acid selected from the group consisting of terephthalic acid and isophthalic acid, and a dialcohol selected from the group consisting of ethylene glycol and neopentyl glycol and having a molecular weight of from 15,000 to 20,000.

2. The adhesive composition as claimed in claim 1, in which the ethylene copolymer is an ethylene-vinylacetate copolymer having a vinyl acetate content of approximately 18 percent by weight and a melt index of approximately of 150.

3. The adhesive composition as claimed in claim 1, in which the ethylene copolymer is an ethylene-ethyl acrylate copolymer having an ethyl acrylate content of approximately 20 percent by weight and metal index of approximately 18.

4. The adhesive composition as claimed in claim 1, in which the thermoplastic resin is a chlorinated polyethylene with a chlorine content of approximately 30 percent prepared by chlorinating a high-density polyethylene of an average molecular weight of approximately 30,000.

5. The adhesive composition as claimed in claim 13, in which the thermoplastic resin is a polyamide selected from group consisting of a resin of polyamide (3) having a molecular weight of approximately 30,000, and a copolymerized nylon consisting of a copolymer of the salt of polyamide (2), the salt of polyamide (3) and $\Sigma$-caprolactam and having a molecular weight of from 40,000 to 50,000.

6. The adhesive composition as claimed in claim 1, in which the thermoplastic resin is a polyester resin consisting of a terephthalic acid with an ethylene glycol and having a molecular weight of from 15,000 to 20,000.

7. An adhesive composition consisting essentially of:
   a. from 25 to 85 parts by weight of at least one ethylene copolymer selected from the group consisting of an ethylene-vinyl acetate copolymer having a melt index of from 2.5 to 150 and a vinyl acetate content of from 18 to 40 percent by weight, and an ethylene-ethyl acrylate copolymer having a melt index of from 2.5 to 28 and an ethyl acrylate content of from 20 to 30 percent be weight;
   b. from 5 to 50 parts by weight of at least one thermoplastic resin selected from the group consisting of polyamides selected from the group consisting of (1) the condensation product of $\omega$-amino caproic acid or the product of the open ring polymerization of $\Sigma$-caprolactam, (2) the poly-condensation product of hexamethylene diamine and adipic acid, (3) the poly-condensation product of hexamethylene diamine and sebacic acid, (4) the poly-condensation product of hexamethylene diamine and $\omega$-amino-undecanoic acid and copolymers consisting of the salt of polyamide (2), the salt of polyamide (3) and - caprolactam and having a molecular weight of from 20,000 to 50,000, polyesters consisting of the composition formed by reaction of a dicarboxylic acid selected from the group consisting of terephthalic acid and isophthalic acid, and a dialcohol selected from the group consisting of ethylene glycol and neopentyl glycol and having a molecular weight of from 15,000 to 20,000; and
   c. from 10 to 70 parts by weight of at least one conditioning agent selected from the group consisting of low-molecular-weight polyethylenes having a molecular weight of from 1,500 to 7,000, turpentine resins having a molecular weight of from 800 to 1,200, and petroleum resins having a molecular weight of from 800 to 1,500.

8. The adhesive composition as claimed in claim 7, in which the conditioning agent is a polyethylene having a molecular weight of approximately 2,500.

9. The adhesive composition as claimed in claim 7, in which the conditioning agent is a turpentine resin having a molecular weight of approximately 1,000.

10. The adhesive composition as claimed in claim 7, in which the conditioning agent is a petroleum resin having a molecular weight of 1,400.

* * * * *